May 26, 1953  C. W. EARP ET AL  2,640,191
COMBINED RADIO DIRECTION AND DISTANCE FINDING SYSTEM
Filed June 21, 1947  2 Sheets-Sheet 1

Inventor
Charles William Earp.
Richard Francis Cleaver
By
Attorney

UNITED STATES PATENT OFFICE 2,640,191

COMBINED RADIO DIRECTION AND DISTANCE FINDING SYSTEM

Charles Williams Earp and Richard Francis Cleaver, London, England, assignors to International Standard Electric Corporation, New York, N. Y.

Application June 21, 1947, Serial No. 756,264
In Great Britain June 21, 1946

9 Claims. (Cl. 343—10)

This invention relates to combined radio direction and distance finding systems. More particularly, it relates to combined radio direction and distance finding systems responding only to co-operating mobile stations, such as aircraft, of which it is desired to know the location.

The use of radio direction finders to determine the direction and position of aircraft for airport control purposes has been standard practice for many years, the position of the aircraft being fixed by triangulation with reference to bearings taken simultaneously by two co-operating but suitably spaced direction-finding stations. For these bearings to be taken, the aircraft transmits on a given wavelength, usually only when so requested by the controlling authority.

An alternative system of finding the position of an aircraft is by the use of radio obstacle-detection equipment, in which the distance is determined by measurement of the time taken by a signal to be propagated from a ground transmitter to the aircraft and returned to the immediate neighbourhood of the transmitting station by reflection from the aircraft, the direction being determined at the same time by noting the elevation and azimuth angles of the (highly directive) transmitting or receiving antenna corresponding to maximum reception of the reflected signal. The position of an obstacle as determined by these means may then be displayed on the screen of a cathode ray oscillograph in the form of what is frequently called a "plan position indication," the surface of the screen corresponding to an area of given radius round the transmitting station, and the position of the aircraft being shown by a beam spot at the appropriate point in the screen. Since the role of the aircraft in this process is entirely passive, the detecting system makes no distinction between one aircraft and another, and the position of several aircraft may be shown simultaneously on the same position indicator without any means of separate identification.

In order to overcome the difficulty of distinguishing between aircraft, systems have been devised in which the aircraft plays an active role, and is equipped with means for receiving the signal radiated by the ground transmitter and automatically re-radiating the signal not as received, but modulated by some distinguishing character which will identify the aircraft. A transmitter with special modulation means is required on the aircraft.

The present invention has an important application for use in airport control systems handling aircraft equipped with transmitter and receiver for communication purposes, particularly in those fields now served by direction-finding stations co-operating in groups to provide a "fixing" service by means of cross-bearing observations. Only a single direction-finding station is required in a given service area, with consequent economy in equipment and personnel, and increase in speed of operation. A position-finding service can be given even from an area too limited for cross-bearings to be taken, for example on an island base or on an aircraft carrier.

According to its most general aspect the present invention provides a radio direction and distance finding system comprising a fixed station and a co-operating mobile station whose position it is desired to determine, comprising means at said fixed station for radiating a first modulated carrier wave, means at said mobile station for radiating a second carrier wave modulated in response to said modulation of said first carrier wave as received at said mobile station, the frequency of said second carrier wave being different from that of said first carrier wave, and at the fixed station means responsive to said second radiated carrier wave yielding automatically an indication of the azimuth bearing of said mobile station, means responsive to the waves of said modulations of said first and second carrier waves yielding an indication of the distance of said mobile station from said fixed station, and means for jointly displaying both said indications. The means for jointly displaying said indications may comprise a cathode ray oscillograph, means for displaying the azimuth bearing indication on the screen of said oscillograph as a unidirectional radial line trace, said trace serving also as a distance base-line, and means for displaying said distance indication against said radial trace line.

More specifically, the invention provides radio direction and distance finding system comprising a fixed station, and a co-operating mobile station whose position relative to said fixed station it is required to determine, said fixed station comprising a source of a local electrical wave of given relatively low frequency, a first radio transmitter, and means for modulating said first transmitter by said local wave, said mobile station comprising radio receiver means responsive to energy radiated by said first transmitter, a second radio transmitter the carrier frequency of which differs from that of said first transmitter, and means for causing said second transmitter to transmit energy modulated in correspondence with the modulation of the energy to which said receiver means responds, said fixed station further comprising means for receiving energy radiated by said second transmitter, means for determining automatically the direction of propagation of said received energy, a cathode ray oscillograph, means for indicating said direction as a directed radial line trace on the screen of said oscillograph, demodulation means for deriving from said received energy a wave of said given low frequency, means for measuring the phase difference between said derived wave and said local wave thereby to determine the distance of said second transmitter from said fixed station, and means for indicating said phase difference on said trace line.

A better understanding of the invention will be obtained from the following description of a preferred embodiment illustrated by the accompanying drawings, in which.

In connection with the drawings it is to be understood that where apparatus unit-blocks are shown coupled by a single line, this line is is to be interpreted as including whatever number of conductors may be necessary for the effective coupling of the units. It is also to be understood that such coupling lines may include whatever amplifying or attenuating means may be necessary to establish the requisite operating energy levels.

Figure 1:
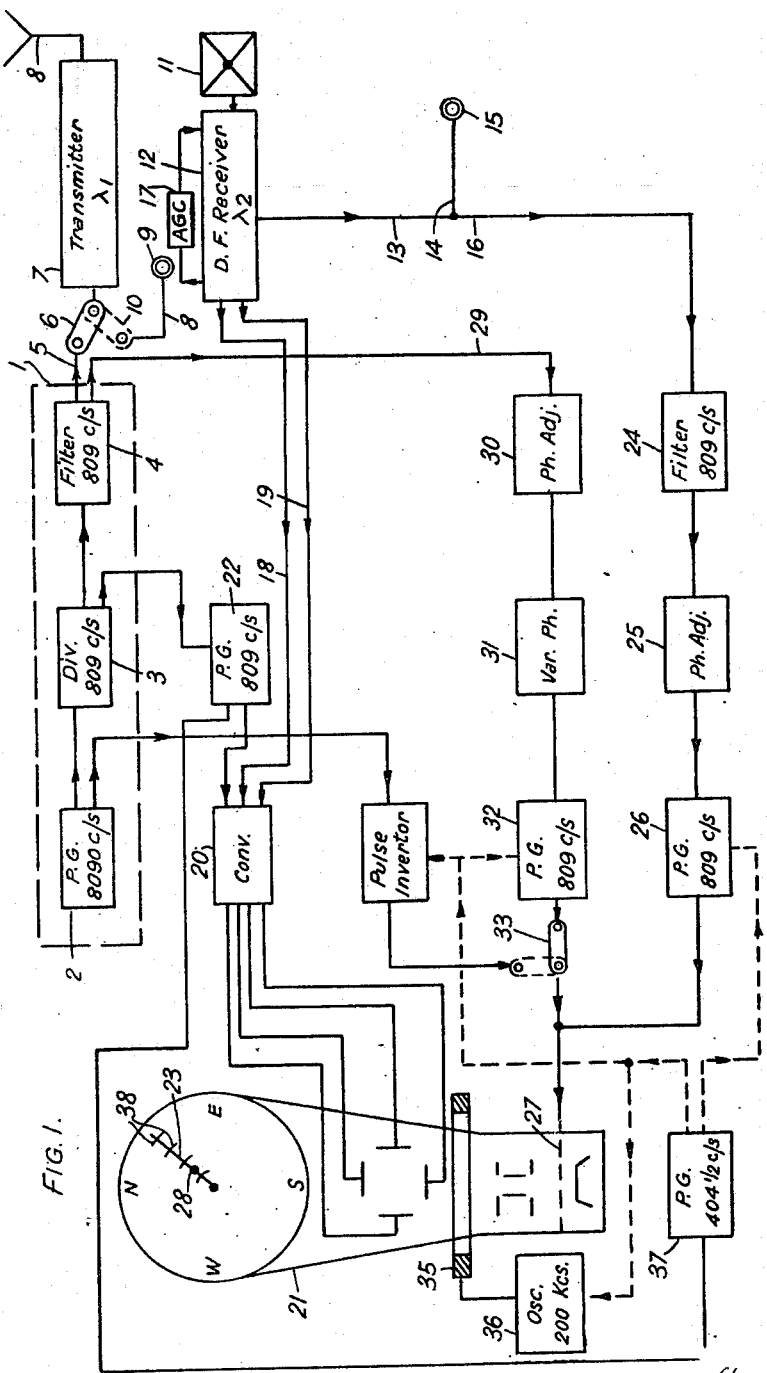
Fig. 1 is a block diagrammatic representation of a fixed station according to the invention.

Referring now to Fig. 1, reference 1 indicates a source of a local electrical wave of given relatively low frequency, in the present instance 809 C./S. This source comprises a pulse generator 2 which delivers pulses of duration of the order of 5 to 10 microseconds and repetition frequency 8090 C./S. to a frequency divider 3 which has a division factor of 10. The output from divider 3 is applied to a filter 4 which selects the component of frequency 809 C./S. This component is applied over connection 5 and switch 6 to modulate radio transmitter 7 which radiates the modulated energy on a wavelength of $\lambda_1$ by omnidirectional antenna 8. Transmitter 7 may be the communication transmitter normally used by the fixed station to communicate intelligence to the co-operative mobile station and to other stations; when so used the switch 6 is transferred from connection 5 to connection 8 over which the intelligence to be transmitted is conveyed from the intelligence modulation source symbolised by reference 9. The switch 6 is then in the position shown at 10.

Reference 11 represents a directional antenna system feeding an automatic direction finder receiver 12 responsive to energy radiated on a wavelength $\lambda_2$ different from the wavelength $\lambda_1$ of transmitter 7.

The combination of antenna 11 and receiver 12 constitutes a direction finding system of the fixed aerial "omni-directional" type, and is essentially an embodiment of the direction-finding system described and claimed in the specification of British Patent No. 490,940, except in the final direction-bearing signal output stage. At the same time as this receiver is used for obtaining the bearing of the mobile station it may be used for telephone communication purpose, and its output includes a message channel for this purpose.

A brief description of the direction finding system comprising 11 and 12 is as follows:

The receiving antenna system 11 is of the Adcock pattern, comprising four dipoles located at the corners of a square, the diagonally opposed pairs of dipoles being cross-connected, the two pairs thus formed giving signal voltages proportional respectively to sin $a$ and cos $a$, where $a$ is the azimuth angle made by the bearing of the signal source relative to one of the pairs. An additional dipole centrally located in the square provides a signal voltage the amplitude of which is independent of the direction of the signal source. The output signals from the dipole pairs are converted in receiver 12 by means of balanced modulators and low frequency oscillators to sidebands of the original carrier frequency. The signal from what is for convenience termed the east-west pair of dipoles is modulated with tone of 5 kc./s. frequency; the balanced modulator suppresses the carrier, but leaves the upper and lower sidebands resulting from the said modulation; these sidebands are proportional in amplitude and also related in phase, to the signal delivered by the dipole pair to the modulator. In like manner the signal from the second or north-south pair of dipoles is modulated with tone of 6 kc./s. frequency to produce sidebands proportional in amplitude and related in phase to the signal delivered by the corresponding dipole pair. The sidebands so produced by the two dipole pairs are then fed, together with the signal derived from the central dipole, to a common amplifier and detector system, at the output terminals of which are obtained two tones, one of 5 kc./s. obtained as a detection product from the centre dipole signal and the 5 kc./s. sidebands corresponding to the east-west dipole pair, and one of 6 kc./s. similarly obtained from the centre dipole signal and the 6 kc./s. sidebands corresponding to the north-south dipole pair. The centre dipole as such is also demodulated, so that the output terminals of the common amplifier and detector system yield, in addition to the two tones mentioned above, any modulation which may have been applied to the received energy at the radiation source thereof. This modulation is isolated, by means of a filter passing a band of say 250 C. P. S. to 3000 C. P. S. the output of the filter being connected over lines 13 and 14 to a message-handling position 15, and also over lines 13 and 16 to the distance-determining circuits as hereinafter described. In the final direction-bearing signal output stage the derived 5 kc./s. and 6 kc./s. tones are partially separated by simple filters, and are then fed each to a differential detector of the type described in the specification of U. S. Patent No. 2,426,187 issued August 26, 1947. In one of these differential detectors the 5 kc./s. derived signal is beaten against a 5 kc./s. tone taken directly from the east-west modulation oscillator, to yield a D. C. output voltage the magnitude and sense of which varies with the magnitude and phase of the derived 5 kc./s. tone i. e. with the magnitude and phase of the signal delivered by the east-west pair of dipoles. Similarly in the other differential detector the derived 6 kc./s. tone—is beaten against a 6 kc./s. tone taken directly from the north-south modulation oscillator to yield a second D. C.

output voltage the magnitude and sense of which varies with the magnitude and the phase of the signal delivered by the north-south pair of dipoles. The direction-bearing output of receiver 12 thus consists of two D. C. voltages corresponding respectively in signal and magnitude to sine and cosine functions of the azimuth angle of the direction of propagation of the received energy, the ratio of the two voltages being the tangent (or cotangent) of the said azimuth angle. Included in receiver 12 are automatic gain control means, indicated at 17, whereby for any given azimuth angle the magnitudes of the two D. C. voltages are made substantially independent of variations of intensity of the received radiant energy over a predetermined range of intensity.

The two D. C. voltages thus obtained are applied over lines 18, 19 to a converter means 20 which supplies corresponding deflecting voltages to the customary electrostatic X and Y deflecting plates of cathode ray oscillograph 21, the power supplies for which are of conventional type and have been omitted from the drawing for the sake of simplicity. Converter means 20 is an arrangement such as is disclosed in the specification of British Patent No. 590,260 issued October 9, 1947, in which the deflecting plate potentials are obtained from condensers charged through resistances by the said D. C. voltages and periodically discharged by electronic switches controlled by a square-wave pulse generator 22 the timing of which is controlled by part of the output of frequency divider 3, and which delivers pulses of repetition frequency equal to that of the local wave i. e. 809 C./S. in the present instance; the deflection of the beam spot taking the form of a linear radial sweep trace indicated at 23, the direction of which corresponds, without any 180° ambiguity, to the direction from which the signals are received, and which is outwardly directed from the centre of the screen; the return stroke being so fast as to leave no visible trace. The radial sweep trace thus produced may be used as a scanning trace, repeated with the periodicity of the pulse generator 22 which controls the electronic switches and having a duration adjustable by the condenser resistance network. So far as direction finding is concerned, the frequency of the pulse generator may be varied widely, so long as it is sufficiently high to give a trace devoid of flicker, and so long as the deflector plate circuit time constants are made suitable for the frequency chosen. In the present invention, however, the frequency of the pulse generator is governed by the use of the trace as a scanning line for distance determination, and is for that reason made the same as the frequency of the modulation applied to the ground transmitter i. e. 809 C. P. S. By suitably arranging the time constant of the deflector plate circuit, an approximately linear time scale can be obtained along the radial trace, of duration just over half a period of the transmitter modulation, while by stabilising the deflecting potentials by automatic gain control means in the receiver the length of the trace line is made substantially constant.

As already mentioned, demodulated output from receiver 12, is connected a distance-determining circuit over lines 13 and 16. The demodulation wave is first applied to a narrow band 809 C. P. S. filter 24 to remove any extraneous noise. The wave thus filtered is then passed through a phase adjuster 25 compensating for unwanted phase shifts in the fixed station ground equipment and used to control a generator 26 of sharp pulses at a repetition frequency of 809 periods per second, the timing of which depends on the phase of the modulation of the received signal, and the duration of which may be of the order of 10 microseconds. These pulses are then applied to a control grid 27 of the cathode ray tube 21 in such sense as to increase the brightness of the beam, with the result that the trace on the oscillograph screen takes the form of a radial line on which appears a bright spot, indicated at 28, the direction of the line corresponding to the direction of the mobile station, and the position of the spot relative to the origin of the line corresponding to the distance of the mobile station. With a suitable deflector plate time constant, it may be assumed that the time-scanning along the radial trace is linear, in which case the distance of the spot from the origin of the trace may be scaled off and translated into distance of the mobile station according to well-known radio obstacle-detector practice.

Since it is difficult to ensure that the time-scanning is a strictly linear function of the distance along the trace line, a more accurate determination of the distance of the mobile station is made available by providing a "sliding cursor" electronic indication in the following manner. An 809 C./S. wave from the source 1 is fed over line 29 to phase adjusting unit 30, which compensates for unwanted phase shifts, and then through a calibrated variable phasing unit 31 to a second generator 32 of narrow pulses of the same periodicity 809 C./S. The output of this second pulse generator is applied through the two-position switch 33 to the brightness control grid 27 of the cathode ray oscillograph 21 in such sense that the pulses increase the brightness. As a result, the radial trace line exhibits two bright spots, the first corresponding to the phase of the received modulation as explained in the preceding paragraph, and the second, due to pulse generator 32, the timing and therefore the position of which is variable with adjustment of the variable phasing unit. The latter is varied until the position of the second spot is brought into coincidence with the first spot. The change in phase necessary to move the second spot from the zero distance position i. e. the orgin of the trace, to coincidence is then a direct measurement of the over-all phase difference between the transmitted and received modulations, and hence of the distance of the mobile station, independent of the law of the time scale.

While the "sliding cursor" method of translating the indication of the screen into a distance reading is precise, it involves a manual operation and therefore occupies more time than if a direct scale reading were possible. An alternative system is therefore provided by which a scale of distances may be electronically marked on the trace line, the position of the scale-marks being automatically adjusted to take care of whatever departure from linearity the scanning time base may exhibit. Narrow pulses at exactly ten times the frequency of the local wave pulses are applied from pulse generator 2 through inverter 34 to the control grid 27 of the cathode ray oscillograph 21 in the same manner as the pulses previously referred to, with the result that along the trace line there appear a number of fixed bright marking spots, the spacing between any two adjacent spots always representing one tenth of the distance corresponding to a full cycle of the local wave i. e. of the modulation of transmitter 7, independent of the law relating distance along the trace line with scanning time. The distance of the mobile station may then be quickly ascertained to a good degree of accuracy by reading the position of the distance spot on the scale thus provided, interpolating as necessary. With a transmitter modulation of 809 C. P. S., the distance corresponding to the spacing between any two adjacent calibration marks is 10 nautical miles.

Switching means 33 are provided whereby either the "sliding cursor" or the electronic calibration scale may be cut in as desired.

It will be observed that in the system so far described all the indications on the radial trace take the same form, that of bright spots, regardless of whether they represent the distance indication, calibration marking indications, or the "sliding cursor" indicator. In practice there is usually little difficulty in distinguishing the distance indication spot from the other indications. In order to remove any doubt, however, an auxiliary circuit is included which transforms the calibration or sliding cursor spots into short lines perpendicular to the radial trace, and covering an arc of about 10°, but leaves the distance indication spot unaffected. This is performed by subjecting the oscillograph beam to a high frequency magnetic field characterised in that at all points within the effective region the field comprises a component parallel to the axis of the oscillograph beam, and a component radial to this axis and normal to the said parallel component. This field is excited by a coil, indicated at 35, concentric with the beam axis of the oscillograph and energised from a source 36 of alternating current of relatively high frequency, about 200 kc./s., which is not an integral multiple of the calibration pulse repetition frequency. The optimum position of the coil along the axis of the oscillograph is found experimentally. A rectangular-wave pulse generator 37, controlled from pulse generator 22, operating at half the local wave given low frequency i. e. at 404½ C./S., and producing a wave having substantially equal positive and negative half cycles, is arranged to block alternately (a) the pulse generator 26 which delivers the distance indicating pulse derived from the received signal, and (b) the two pulse sources 32 and 34 which deliver respectively the sliding cursor marking pulse and the scale calibration marking pulses.

In addition, the energisation of source 36 which excites field coil 35 is blocked during the period in which the distance-indicating pulse may be applied to control electrode 27. The result is that the alternate sweeps of the radial trace line are accompanied by entirely different types of indication displays one sweep showing only the distance indicating pulse displayed simply as a bright spot on the trace line, with no calibration scale spots or shiftable spot, while the following sweep shows, according to the position of switch 33, either calibration scale marks or shiftable indication marks in the form of short arcuate lines, indicated at 38, cutting the radial trace line perpendicularly, but does not display the distance-indicating spot. Due to persistence of vision both sets of marks are visible simultaneously and are clearly distinguished one from the other, the distance mark being a spot and all calibration marks being short arcuate traces.

Figure 2:
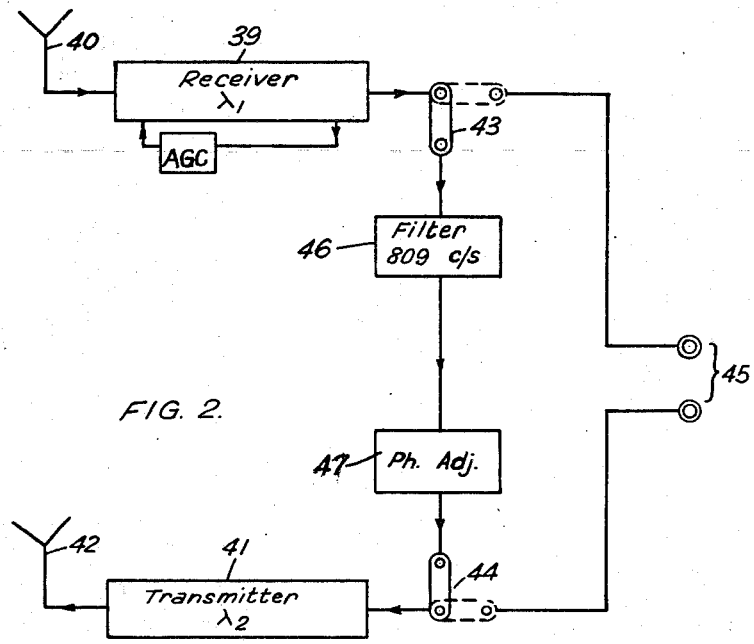
Fig. 2 is a block diagrammatic representation of a mobile station according to the invention, co-operative with the fixed station illustrated in Fig. 1.

Referring now to Fig. 2 which illustrates the equipment on the mobile station co-operatively associated with the fixed station illustrated in Fig. 1, receiver 39 responsive to the wavelength $\lambda_1$ of the fixed station transmitter, is energised from antenna 40; this receiver may form part of the normal message communication equipment of the mobile station. Transmitter 41 energises antenna 42 at the wavelength $\lambda_2$ to which the fixed station receiving equipment responds, and may also form part of the normal message communication equipment of the mobile station. Switch means 43 and 44 are provided whereby receiver 39 and transmitter 41 may either be connected to a message position, indicated by reference 45, for handling service traffic, or may be coupled together so that the demodulated output of receiver is applied through a filter 46 selectively responsive to the frequency of 809 C./S., i. e. to the given low frequency used at a fixed station to modulate transmitter 7, and through phase adjusting means 47 which compensates for the inherent phase shifts in receiver 39, transmitter 41, and filter 46 and ensures that the phase of modulation of the energy radiated by antenna 42 is the same as the phase of modulation of the energy received at antenna 40 by radiation from fixed station antenna 8. In the present instance transmitter 41 is adapted for amplitude modulation, and receiver 39 comprises automatic gain control means, indicated by block diagram, adjusted so that the output of the receiver is sufficient to modulate fully the transmitter 41 at all distances within the normal working range of the direction and distance finding system. Antennae 40 and 42 both omni-directional, but are spaced sufficiently far apart to ensure that the effective coupling between the receiving and transmitting circuits, taking into account the difference in wavelengths and the selectivity of the receiver, is not sufficient to set up singing round the mobile station transmitter-receiver loop.

Since on any mobile station the possible separation between the two antennae is usually very limited, it may be necessary to equip the receiver 39 with rejector circuits having very high selective attenuation at the transmitter wavelength $\lambda_2$.

Figure 3:
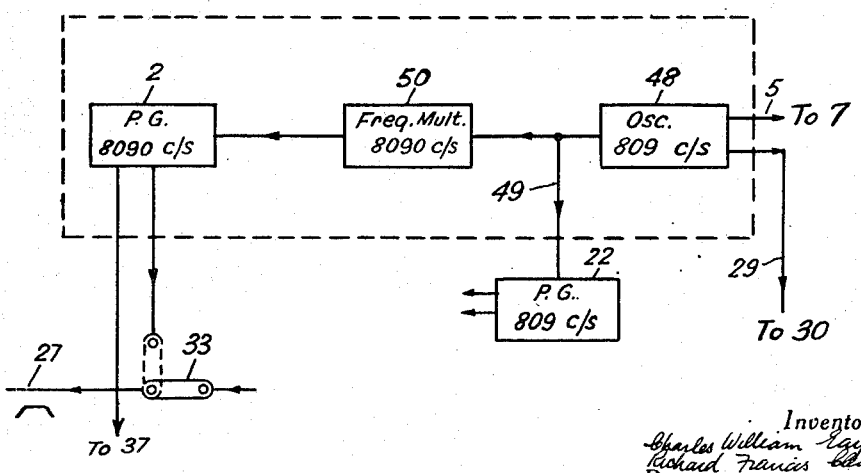
Fig. 3 illustrates an alternative construction of part of the fixed station represented in Fig. 1.

Referring now to Fig. 3, this illustrates a slight modification to the arrangement shown in Fig. 1 in respect of the apparatus therein indicated by reference numeral 1 and enclosed within a dashed-line rectangle. This apparatus is replaced in Fig. 3 by a 809 C./S. oscillator, reference 48, which by itself supplies the local wave of given relatively low frequency, its output being fed to transmitter 7 over connection 5 and to phase adjuster 30 over connection 29, and to the time sweep pulse generator 22 over connection 49 i. e. the timing of pulse generator 22 is controlled from oscillator 48 instead of from the output of frequency divider 3. Output from oscillator 48 is fed to a frequency multiplier 50 having a multiplication factor of 10, the output of which is applied to control the timing of pulse generator 2 of repetition frequency 8090, which serves as a source of calibration pulses for the scale calibration just as in Fig. 1. Since however pulse generator 2 in the arrangement of Fig. 3 has no other function than to supply calibration pulses, the pulse inverter 34 may be omitted and the output of generator 2 applied through switch 33 to the electrode 27 of cathode ray oscillograph 21, in which case the blocking pulses from pulse generator 37, used to distinguish the calibration indication from the distance indicating spot, are applied to block pulse generator 2 instead of the inverter 34. The arrangement illustrated by Fig. 3 has therefore some advantage over the arrangement first described in connection with Fig. 1, in that it permits some simplification by removing the need for inverter 34. This advantage is however to some extent off-set by the reduction in the stability of the relative phase relations between the source of calibrating pulses and the source of given low frequency which controls the system as a whole.

The operation of the system as a whole will now be described, with particular reference to its application to aircraft navigation, the fixed station being an airport control station, and the mobile station being on an aircraft. It will be obvious however that the invention is not limited in its application to aircraft navigation, but may be applied to position finding in connection with ships or other mobile stations of any description.

The airport control station gets into touch with the aircraft, the position of which it is desired to determine, over the normal radio communication channel. Transmitter 7 forming part of the control station equipment then transmits on wavelength $\lambda_1$ for a short period modulating tone the frequency of which, 809 C./S. is predetermined and based on the radius over which position-finding service is to be given. During the same period the aircraft receiver 39 which is tuned to the ground transmitter 7 has its low frequency output connected to transmitter 41 on the aircraft operating on a different wavelength $\lambda_2$, to modulate the output thereof at the frequency of the predetermined modulating tone i. e. at 809 C./S., the phase of this modulation applied to the aircraft transmitter being determined by the phase of the modulation at the ground transmitter and the phase delay due to the time required to propagate the signal over the distance from the ground transmitter to the aircraft, and of course whatever phase delay may be involved in the aircraft equipment. The signal thus emitted by the aircraft is received on the direction finding system of the airport station type and displayed on the screen of the cathode ray tube 21 in the form of a radial trace line 23 the direction of which indicates the direction from which the signal has been received. This trace line is constituted by a repeated sweep of the oscillograph beam between its undeflected position and a point determined by voltages derived from the direction-finding equipment, the repetition frequency of the sweep being 809 C./S. i. e. that of the modulating frequency of the ground transmitter 7, and the sweep being unidirectional in character in the sense that only the outward stroke, i. e. away from the undeflected position, is visible, the return stroke being made at such high velocity as to be virtually blacked out. In addition to being used to give a directional indication as described above, the signal from the aircraft transmitter 41 is demodulated, and a pulse the timing of which depends on the phase of the demodulated signal is displayed on the said trace line used as a scanning base. By making the phase of the radial trace line sweep voltage to be the same as that of the ground transmitter modulation, and compensating by means of phase adjuster 25 for any phase change which occurs solely in the apparatus, and is therefore constant for a given frequency, the distance of the pulse indication from the origin of the trace is determined solely by the propagation time involved in transmission from the ground transmitter to the aircraft receiver and from the aircraft receiver to the ground receiver, and is therefore a function of the distance of the aircraft, the total phase delay due to propagation time being 720° $fd/c$, where $f$ is the modulation frequency, $d$ the distance of the aircraft, and $c$ the velocity of propagation. With $f$ selected at for example 809 C./S., a radial trace having a sweep duration extending just over 180° of the 809 C./S. modulating tone will be able to accommodate distance indications up to just over 50 nautical miles. The translation of the pulse-spot position relative to the origin of the trace into an aircraft-distance reading depends on the function relating the travel of the beam along the trace line with time. If this law is strictly linear, the distance from pulse spot to origin is a direct measure of the distance of the aircraft station. If the law is not strictly linear, a calibration scale derived from pulse generator 2 and pulse inverter 34 over switch 33 may be marked electronically on the trace which will automatically take care of the non-linearity; or alternatively a movable calibration spot may be generated by pulse generator 32 timed through variable phase means 31 and applied through switch 33, whereby the phase corresponding to the pulse spot position may be measured, and then multiplied by the appropriate factor to give the distance of the aircraft. Both these methods of obtaining an electronic calibration have already been described in connection with the ground station equipment illustrated in Fig. 1 and also with the modification illustrated in Fig. 3.

As mentioned above, the aircraft transmitter and the ground receiver operate on a wavelength different from that of the ground transmitter. The ground station is thereby prevented from responding to signals reflected from aircraft or other obstacles such as hangers. Furthermore, while a number of aircraft may be within the service area, the re-transmission of the predetermined modulating tone is made only by that one aircraft which is directed to do so by the airport controller. There can therefore be no risk that the observed position is identified with the wrong aircraft.

The choice of wavelengths used by the ground transmitter and the aircraft is unfettered by any requirement of the system other than that the difference between the two wavelengths should be sufficient to prevent interference between them either on the ground station or on the aircraft station, that the air-to-ground wavelength used is suitable for direction-finding work within the desired service range, and that there is no risk of multiple path transmission in either direction. In practice this last condition usually favours the V. H. F. range of wavelengths, since these are little reflected from the ionosphere.

The type of modulation to be used is likewise free from restriction, on condition that the demodulating arrangements are of appropriate character, in the embodiment of the invention hereinbefore described the aircraft transmitter is amplitude modulated, but frequency or pulse modulation might equally well be used at one or both transmitters, provided that the receiving apparatus, and more particularly the direction-finding system, is adapted to operate on waves thus modulated. Whatever type of modulation is employed, the essential features are that the waveform of the ground station modulation is transferred to the aircraft transmitter, and that means are included for indicating the phase difference between the modulation of the signal transmitted at the ground station and the modulation received at the ground station after retransmission via the aircraft. Included in these means there should be means for compensating for phase delays in the apparatus per se, so that the phase difference actually measured corresponds only to the phase difference arising from propagation over the go and return paths between ground station and the aircraft whose position is to be indicated. Variations in phase shift between individual aircraft equipment circuits will generally make it preferable to compensate for such phase shifts by a pre-set adjustable network in each aircraft, as in the embodiment described with reference to Fig. 2.

For convenience the ground equipment has been collectively referred to as constituting a "fixed station" or "ground station." This should be taken as implying not that all the equipment is in one building, but merely that it constitutes a single operating unit. In practice the ground transmitter and its associated aerial may be located at a considerable distance from the receiving equipment and the cathode ray oscillograph indicating system on which the position is displayed may be at still another location. For example, in one project embodying the invention the oscillograph system is located in an airport control tower distant from the receiving station by about a mile, and operated therefrom through a remote control system which transfers over a connecting wire line system the deflecting and other voltages required to produce the indication on the screen; while the associated transmitter is located at still another point distant from the receiving station by about a half-mile. If the transmitter and receiver of the fixed station are widely spaced it will be necessary to apply a correction to the distance determination, this correction increasing in magnitude as the mobile station approaches the system, and varying with the direction of approach. This correction may be done by transferring the oscillograph indication to a map constructed to a special projection to take account of the positioning of the transmitting and receiving portions of the ground station, in accordance with known technique.

Since the ground station transmits and receives different wavelength, both transmitter and receiver antenna systems may be of the omni-directional type, i. e. adapted to transmit in all directions simultaneously and to receive and to determine the direction of signals from any direction. The system as a whole may therefore be described as omni-directional in character.

While the embodiment of the system described above is intended to operate normally over a service radius of up to 50 nautical miles with direct reading of distance either by scale calibration or by the "sliding cursor" method, the range may be extended to cover a radius lying between 50 and 100 nautical miles by simply reversing the phase of the outgoing modulation tone relative to the phase of the radial trace time base control voltage, reading of the indicated distance as before, and then adding the 50 nautical miles corresponding to the phase reversal.

It will be obvious that the phasing means to compensate for phase changes inherent in the transmitter and receiver apparatus per se, both on the ground and on the aircraft, may be either concentrated at one point or distributed throughout the system, and may take the form of either phase delay equalisation by making the total delay of the radial trace line scanning wave relative to the modulation the same as the delay in the pulse produced by the received signal, or by balancing the phase change in each apparatus unit by a phase change of opposite sense, or a combination of both methods.

It will also be obvious that other forms of direction-finding system may be used than that described in connection with Fig. 1. All that is necessary is that the direction-finding system shall be capable of supplying a directional indication which can be displayed as a directed time-sweep indication. For example, the Adcock pairs may be replaced by two crossed loop antennae, and each of these antennae may supply its own receiver to yield a voltage which is a sine or cosine function of the azimuth bearing. Moreover, it is not necessary that the wave of the local low frequency used to determine the distance be derived from the energy received by the direction-finding equipment, a separate receiver may be used for this purpose if the type of direction-finding system is such that antenna switching or similar operations render it difficult or impossible to extract the modulation of the received energy.

We claim:

1. A radio direction and distance finding system comprising a fixed station, and a co-operating mobile station whose position relative to said fixed station is to be determined, said fixed station comprising a source of a local electrical wave of given relatively low frequency, a first radio transmitter, and means for modulating said first transmitter by said local wave; said mobile station comprising radio receiver means responsive to energy radiated by said first transmitter, a second radio transmitter, the carrier frequency of which differs from that of said first transmitter, demodulation means, and means for applying the output of said demodulation means to said second transmitter to modulate the energy transmitted therefrom in correspondence with the modulation of the energy to which said receiver means responds; means compensating for the phase shift of said energy produced in passing from the receiver to said second transmitter; said fixed station further comprising means for receiving energy radiated by said second transmitter, means for determining automatically the direction of propagation of said received energy, a cathode ray oscillograph, means for indicating said direction as a directed radial line trace on the screen of said oscillograph; demodulation means for deriving from said received energy a wave of said given low frequency, means for measuring the phase difference between said derived wave and said local wave to determine the distance of said second transmitter from said fixed station, and means for indicating said phase difference on said trace line.

2. A system according to claim 1, wherein said energy receiving means and said direction determining means at said fixed station includes means for yielding two direct current voltages corresponding respectively in magnitude and sense to the sine and cosine functions of the azimuth angle of said direction of propagation.

3. A system according to claim 2 wherein said means for indicating said direction comprises means for producing on the screen of said oscillograph a time-sweep linear trace recurrent at said low frequency and outwardly directed from the center of said screen, the angular coordinate of said trace being determined by the ratio of said direct current voltages, the duration of said sweep being not less than one-half period of said given low frequency.

4. A system according to claim 3, and further comprising means for controlling the initiating timing of said time-sweep by said local wave of given low frequency, means for generating short pulses repetitive at said given low frequency, means for applying said derived wave to said pulse generating means to control the timing of said pulses, and means to apply said pulses to an electrode of said cathode ray oscillograph to control the intensity of the oscillograph beam, whereby a bright distance indicating spot appears on said time-sweep trace line at a distance from the origin corresponding to the phase difference between said local wave and said derived wave.

5. A system according to claim 4, further including electronic means for calibrating the position of said distance-indicating spot, said means comprising a generator of short calibration pulses of repetition frequency N times said given low frequency, where N is an integer which may be unity, means for timing said calibration pulses with respect to said local wave of given low frequency, and means for applying said calibration pulses to an electrode of said cathode ray oscillograph to control the intensity of the oscillograph beam in such manner as to display a bright calibration indication on said trace line.

6. A radio direction and distance finding system comprising a fixed station, and a cooperating mobile station whose position relative to said fixed station is to be determined, said fixed station comprising a source of a local electrical wave of given relatively low frequency, a first radio transmitter, and means for modulating said first transmitter by said local waves; said mobile station comprising radio receiver means responsive to energy radiated by said first transmitter, a second radio transmitter, the carrier frequency of which differs from that of said first transmitter, demodulation means, and means for applying the output of said demodulation means to said second transmitter to modulate the energy transmitted therefrom in correspondence with the modulation of the energy to which said receiver means responds; means compensating for the phase shift of said energy produced in passing from the receiver to said second transmitter; said fixed station further comprising means for receiving energy radiated by said second transmitter, means for determining automatically the direction of propagation of said received energy, means for yielding two direct current voltages corresponding respectively in magnitude and sense to the sine and cosine functions of the azimuth angle of said direction of propagation, a cathode ray oscillograph, means for indicating said direction and producing on the screen of said oscillograph a time-sweep liner trace recurrent at said given low frequency and outwardly directed from the center of said screen, the angular coordinate of said trace being determined by the ratio of said direct current voltages, demodulation means for deriving from said received energy of wave of said given low frequency, means for controlling the initiation-timing of said time-sweep by said local wave of given low frequency, means for generating short pulses repetitive at said given low frequency, means for applying said derived wave to said pulse-generating means to control the timing of said pulses, and means to apply said pulses to an electrode of said cathode ray oscillograph to control the intensity of the oscillograph beam whereby a bright distance-indicating spot appears on said time-sweep trace line at a distance from the origin corresponding to the phase difference between said local wave and said derived wave; means for calibrating the position of said distance-indicating spot, said means comprising a generator of short calibration pulses of repetition frequency N times said given low frequency, where N is an integer which may be unity, means for timing said calibration pulses with respect to said local wave of given low frequency, and means for applying said calibration pulses to an electrode of said cathode ray oscillograph to control the intensity of the oscillograph beam in such manner as to display a bright calibration indication on said trace line; and means for distinguishing said calibration indication from said distance-indicating spot, comprising means for applying to the beam of said oscillograph an alternating magnetic field of relatively high frequency other than an integral multiple of the calibration pulses repetition frequency, said magnetic field being characterized in that at all points within the effective region the field comprises a component parallel to the axis of the oscillograph beam and a component radial to said axis and normal to said parallel component, means for blocking the application to said oscillograph of said magnetic field and of said calibration pulses throughout alternate sweeps of said trace line, and means for blocking the application of said distance-indicating pulses through the intervening sweeps of said trace line, whereby said calibration indication is distinguished by being drawn out over a short arc normal to said radial line trace.

7. A system according to claim 6 wherein N is unity, and further including circuit means for applying said local wave of given low frequency to control the timing of said calibration pulses, said circuit means comprising calibrated continuously variable phase adjusting means which is adjusted until the single spot corresponding to said calibration pulses is brought into coincidence with the distance indicating spot, the amount of adjustment required corresponding to the phase difference to be measured.

8. A system according to claim 6 wherein N is greater than unity and said source of a local electric wave comprises frequency-divider means having a division factor of N, means for applying said pulses from said calibration pulse generator to the input of said frequency-divider means, and frequency-selective means for deriving said local wave of given low frequency from the output of said frequency divider, whereby there is displayed on said trace a plurality of calibration indication spots, forming a measuring scale, the distance along the trace between any two adjacent calibration spots corresponding to a phase difference of 360°/N, at said given low frequency.

9. A system according to claim 6 wherein N is greater than unity and the means for timing said calibration pulses comprises frequency-multiplier means having a multiplication factor of N, means for applying said local wave of given low frequency to the input of said frequency multiplier means, and means for applying the output of said frequency multiplier means to control the timing of said calibration pulses, whereby there is displayed on said trace a plurality of calibration indication spots forming a measuring scale, the distance along the trace between any two adjacent calibration spots corresponding to a phase difference of 360°/N at said given low frequency.

CHARLES WILLIAM EARP.
RICHARD FRANCIS CLEAVER.

References Cited in the file of this patent

UNITED STATES PATENTS

| Number | Name | Date |
|---|---|---|
| 1,750,668 | Green | Mar. 18, 1930 |
| 2,147,810 | Alford | Feb. 21, 1939 |
| 2,198,113 | Holmes | Apr. 23, 1940 |
| 2,248,727 | Strobel | July 8, 1941 |
| 2,252,083 | Luck | Aug. 12, 1941 |
| 2,268,643 | Crosby | Jan. 6, 1942 |
| 2,400,641 | Hardy | May 21, 1946 |
| 2,405,238 | Seeley | Aug. 6, 1946 |
| 2,406,953 | Lewis | Sept. 3, 1946 |
| 2,409,448 | Rost | Oct. 15, 1946 |
| 2,426,217 | Hoisington | Aug. 26, 1947 |
| 2,427,220 | Luck | Sept. 9, 1947 |
| 2,433,341 | Busignies | Dec. 30, 1947 |
| 2,449,985 | Gloess | Sept. 28, 1948 |
| 2,467,299 | Espenschied | Apr. 12, 1949 |
| 2,468,032 | Busignies | Apr. 26, 1949 |
| 2,471,516 | Bryant | May 31, 1949 |
| 2,529,510 | Manley | Nov. 14, 1950 |
| 2,582,971 | Dunmore | Jan. 22, 1952 |